(12) United States Patent
Almalki

(10) Patent No.: US 8,910,843 B2
(45) Date of Patent: Dec. 16, 2014

(54) SELF-WEIGHING BACKPACK WITH WEIGHT NOTIFICATION FEATURES

(71) Applicant: Bader Abdullah Almalki, Mankato, MN (US)

(72) Inventor: Bader Abdullah Almalki, Mankato, MN (US)

(*) Notice: Subject to any disclaimer, the term of this patent is extended or adjusted under 35 U.S.C. 154(b) by 95 days.

(21) Appl. No.: 13/886,494

(22) Filed: May 3, 2013

(65) Prior Publication Data

US 2014/0326771 A1    Nov. 6, 2014

(51) Int. Cl.
*A45F 3/04*     (2006.01)
*A45F 3/00*     (2006.01)
*G01G 19/52*    (2006.01)
*G01G 19/44*    (2006.01)

(52) U.S. Cl.
CPC ............. *A45F 3/04* (2013.01); *A45F 2003/003* (2013.01); *G01G 19/52* (2013.01); *G01G 19/44* (2013.01)
USPC .......................................... 224/576; 177/245

(58) Field of Classification Search
USPC ............................................. 224/576; 177/245
See application file for complete search history.

(56) References Cited

U.S. PATENT DOCUMENTS

| | | | |
|---|---|---|---|
| 3,027,215 A * | 3/1962 | Duncan | 312/245 |
| 7,156,918 B2 * | 1/2007 | Marks | 177/168 |
| 7,265,302 B2 * | 9/2007 | Keech et al. | 177/131 |
| 7,358,449 B2 * | 4/2008 | Hannon | 177/25.13 |
| 7,362,228 B2 * | 4/2008 | Nycz et al. | 340/572.1 |
| 7,404,506 B1 * | 7/2008 | Ross | 224/576 |
| 7,692,107 B1 * | 4/2010 | Shotey et al. | 177/131 |
| 8,344,271 B1 * | 1/2013 | Falk, Jr. | 177/126 |
| 2007/0056779 A1 * | 3/2007 | Laniado et al. | 177/245 |
| 2008/0083802 A1 * | 4/2008 | Reziniano | 224/576 |
| 2009/0314677 A1 * | 12/2009 | Teggatz et al. | 206/457 |

* cited by examiner

*Primary Examiner* — Justin Larson
(74) *Attorney, Agent, or Firm* — Catherine Lytle

(57) ABSTRACT

A self-weighing backpack includes a container body that is connected to right and left carry straps that include strain gauges. Processing circuitry is included that compares dynamic force measurements to a predetermined threshold force and generates an alert when the predetermined threshold force is exceeded.

7 Claims, 7 Drawing Sheets

| MATERIAL | RFID | LOCATION | IN / OUT | ALERT # DAYS IN BACKPACK | ALERT NO RIFD DETECT |
|---|---|---|---|---|---|
| BOOK TITLE | B 001 | BKPK | IN-1 | ④ | |
| HOMEWORK TITLE | H 002 | BKPK | IN-2 OUT-1 | | |
| IMPORTANT PAPER | | | | | |
| | | | | | |
| | | | | | |

| MEDICATION NAME | RFID | IN / OUT | ALERT # DAYS IN BACKPACK | ALERT TIME TO TAKE | ALERT EXPIRATION DATE |
|---|---|---|---|---|---|
| EPI-PEN | M001 | IN-1 | 6 | N/A | 90 DAYS |
|  |  |  |  |  |  |
|  |  |  |  |  |  |
|  |  |  |  |  |  |
|  |  |  |  |  |  |

SELF-WEIGHING BACKPACK WITH WEIGHT NOTIFICATION FEATURES

BACKGROUND

1. Field of the Disclosure

This disclosure relates to a self-weighing backpack with that alerts an end user of the weight of the backpack and its contents and alerts the end user in cases where a processor in the backpack determines that a predetermined weight limit has been exceeded.

2. Description of the Related Art

The "background" description provided herein is for the purpose of generally presenting the context of the disclosure. Work of the presently named inventor, to the extent it is described in this background section, as well as aspects of the description which may not otherwise quality as prior art at the time of filing, are neither expressly nor impliedly admitted as prior art against the present invention.

Backpacks are commonly used by young children, teenagers, and adults to transport a variety of objects. It has been documented that the burden of overweight backpacks are the cause of several neck and back injuries. The American Medical Association has determined weigh limits for filled backpacks based on weight of the end user. Backpacks can be equipped with self-weighing devices and a computer to calculate the exact weight of the backpack and the final weight after it has been filled. One example is described in US 2008/0083802 where a handle is used a strain gauge connector, and the weight of the filled backpack is measured when the bag is lifted by the handle.

SUMMARY

Lack of knowledge as to the exact weight of a backpack can result in the end user over burdening his exoskeleton structure. This disclosure describes a method and apparatus for weighing the contents of a backpack and altering the end user of the weight of the backpack being in the safe or unsafe range based upon the end user's weight and final weight of the backpack. The backpack includes a self-supporting weighing structure, a computer, and an output system. The backpack also addresses a limitation with the above-described prior art device, in that the backpack is weighed while worn by the user, as opposed to lifting the backpack by a single handle before the backpack is mounted on the user. This allows for the backpack to provide alerts to the user depending on the activity of the user. For example, the strain on a child's back is less while the child is walking with a filled backpack, as opposed to the increased kinetic energy imparted on a child's body while the child runs with the backpack and the backpack is bouncing up and down.

In addition to a self-weighing feature, the disclosure describes a backpack device that has a self-contained mechanism for capturing the weight of user and using that to trigger an alarm if the backpack is filled to an unsafe amount for that particular user.

DETAILED DESCRIPTION OF THE EMBODIMENTS

Figure 1:
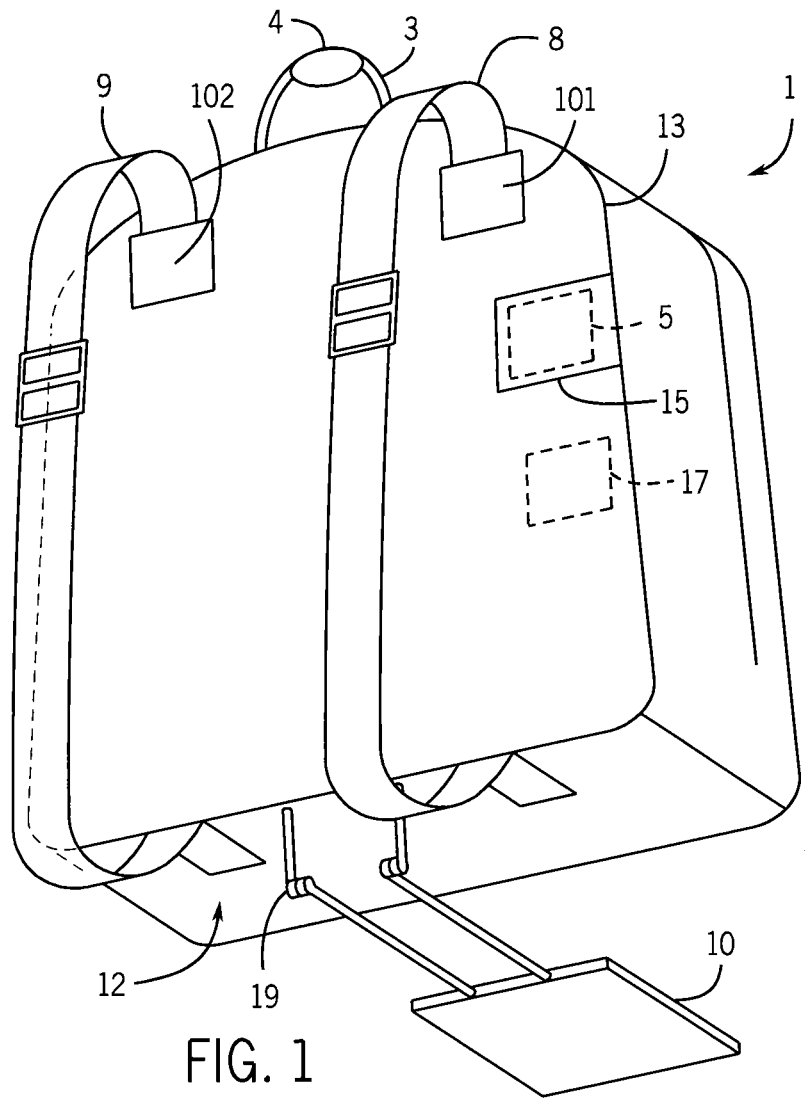
FIG. 1 is a perspective view of a backpack with a self-weighing device and an information panel.

Referring now to the drawings, wherein like reference numerals designate identical or corresponding parts throughout the several views, FIG. 1 is an illustrative view of a backpack 1 having a self-weighing device 10, an RFID reader 5, a left carry strap 8, a right carry strap 9, a central processing unit (CPU) 17, a central loop 3, and an information panel 4. The central loop 3 is disposed on a top side of the backpack 1, centered between the left carry strap 9 and the right carry strap 8. The information panel 4 is integrated into the center loop 3, and provides visual information to the user, such as final weight of the backpack 41 and status 42 of the final weight being in a safe or unsafe range. The RFID reader 5 is securely inserted into a protective pocket 15. The self-weighing device 10 is retractably hinged 19 to an underside 12 of the backpack 1 opposite the display 4 end of the backpack 1. The self-weighing device 10 provides the weight of the filled backpack to the central processing unit 17. The self-weighing device is a compact pressure sensitive commercial scale like the NewlineNY SBB0718M-NYBK bathroom scale. The end user can extend the retractably hinged 19 attachment to access the self-weighing device 10 and weigh himself by stepping on the scale for an assessment of the acceptable carry weight calculation. The weight provided by the scale 10 can be input to the CPU 17 via the information panel 4. Based upon medical recommendations, the CPU 17 calculates the carry weight and determines if the carry weight is acceptable.

In an alternative embodiment, the weight of the backpack 1 is measured by a sum of the weight measured be each of the two straps 2, that each have a strain gauge connected to them. The total weight of the backpack 1 is the sum of the two weights measured by the straps 2 when the backpack 1 is worn by the user. The strain gauges provide an analog signal to an analog to digital converter that converts the weights into an electronic representation of the total weight. This way, the weight of the backpack 1 may is not only the static weight but also the total force applied to the shoulders of the user. Moreover, the total force is a sum of the gravitational force of the mass of the backpack 1 and its contents, but also any kinetic force such as the extra force exerted on the straps when the user is running and the backpack 1 is bouncing up and down on the user's back. When the user is involved in this kind of activity, the total force, at any given instant, may be appreciatively higher than the static weight of the backpack. Since it is the total instantaneous force that is important to monitor for a user, the backpack 1 provides a useful way to keep track of the dynamic forces being imparted on the user, regardless of the user's activities.

Figure 2:
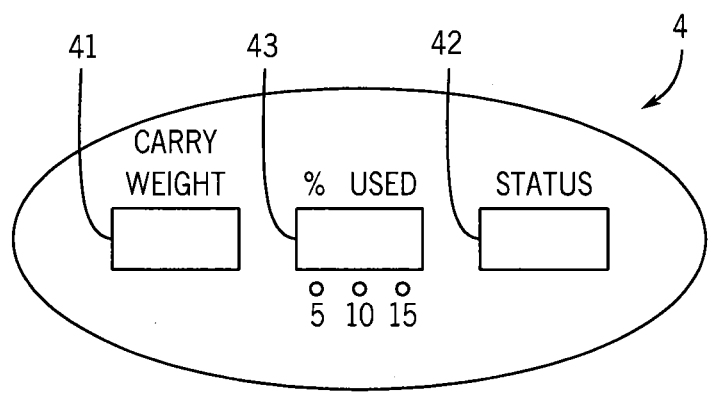
FIG. 2 is a front view of an informational display panel.

FIG. 2 is an illustrative view of an embodiment of the information panel 4 displaying the end weight 41, percentage used 43 to calculate the acceptability of the end weight based upon the end user's weight, and the status 42 of the acceptability of the end weight 41. The information panel is a DC battery powered LCD panel that provides a visual readout of a digital output of the CPU 17 (FIG. 1). The CPU 17 calculates the various values, as well as stores the user's weight in memory, as received from the scale 10 (or the two strain gauges integrated into the straps 2). A wiring bus interconnects the scale 10, with the CPU and information panel 4. Although the display is in terms of the end weight 41, it is actually a force that is an apparent weight. The static weight is the same as the force due to gravity when the backpack 1 is stationary. However, when the user is moving the apparent, instantaneous weight much be much greater due to the backpack being thrust into the air and then returning downward until the straps 2 oppose the downward force of the backpack 1. The visual identifier is a check mark if the end weight is acceptable or an X if the end weight is unacceptable. If the end weight is unacceptable an audible alarm is issued. Thus, the end weight might be acceptable when the backpack 1 is stationary, but however, once the user begins to move, the apparently weight might exceed the threshold weight for sounding the alarm, depending on the activity of the user (e.g., standing, walking, running or jumping).

Figures 3, 4:
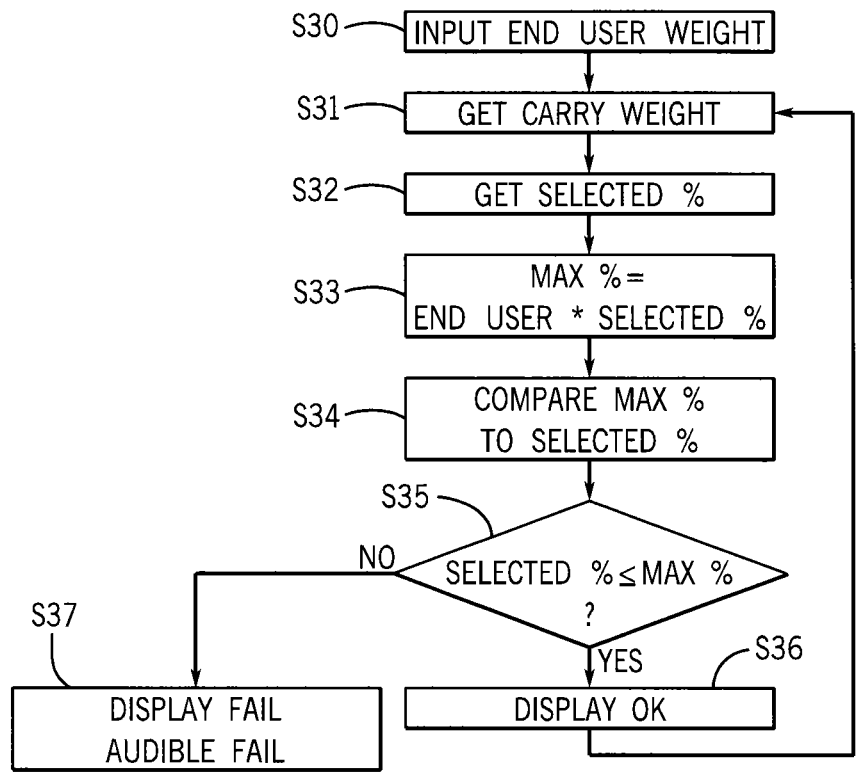
FIG. 3 is a flowchart of a method of identifying and notifying the user of the final weight of the backpack.
FIG. 4 is a lookup table saved on an electronic storage device and used to determine if important items are being stored and removed from the backpack.

FIG. 3 is a flow chart of the process used to determine if the apparent weight of the backpack is acceptable or unacceptable relative to the user's weight and the percentage selected by the end user. Step S30 inputs the weight of the end user into the CPU 17 either manually through the information panel 4 or directly from the scale 10 when the user steps on the scale 10 when is hinged into the open position and the user steps on the scale 10. Step S31 inputs the filled weight of the backpack into the CPU 17 directly from the scale 10 (or the strain gauges built into the straps 2). Step S32 allows the end user to select one of the recommended maximum percentage of weight from the information panel 4. Step S33 uses the information from Steps 30, 31, to compute the maximum percent of carry weight using the calculation of:

End User Weight*Maximum %=Maximum allowable % to be carried

Step S34 compares the Maximum allowable % to be carried to the recommended maximum percentage of weight to be carried. Step S35 process the information from Step S34 and provides a display of acceptable weight in Step S36 or provides a display of unacceptable weight Step S37 and an audible alarm.

In another embodiment, the backpack 1 includes an RFID reader (5 in FIG. 1) that keeps track of different objects added to, or removed from, the backpack 1. FIG. 4 is a look up table saved on a non-transitory electronic storage device (such as a RAM, ROM or an EEPROM), and used to control the information panel 4. The first column from the left identifies the item that was placed inside the backpack 1. When the item, which includes a RFID tag, is placed in the backpack 1, the RFID reader 5 compares the tag with the value in the second column from the left that is associated with the item. The third column from the left indicates the location of the material once it has been placed into the backpack 1. The fourth column from the left indicates if the material has been removed from the backpack 1. The fifth column from the left indicates if the material has exceeded a predetermined number of days in the backpack 1. And the last column indicates if the item has not been associated with the RFID reader identifier. The RFID reader identifier contains the name of the item, when it was placed in the backpack 1 and number of days it can remain in the backpack 1 without taking it out of the backpack 1. An example, according to the first two rows of the lookup table in FIG. 4, items have been placed in the backpack 1. A book having an RFID reader identifier is placed into the backpack, its RFID identifier is stored, the location indicator identifies the book as being placed in the backpack 1 for 4 days. An alert has been posted that the book has remained in the backpack for more than the allowed time. The second row indicates that homework has been identified as being placed in the backpack, removed once, placed in the backpack a second time. No alert has been issued as the number of days in the backpack 1 has not been exceeded. This will be helpful in monitoring if homework or projects are being attended to.

In this embodiment, the information panel 4 is configured to display body weight of the end user, percentage used to calculate the acceptability of the carry weight, carry weight, exceeded number of days that the material has remained in the backpack, and status.

If the item does not come with an RFID identifier, one can be attached and the information associated with the item can be input into the table manually using the information panel 4.

Figures 5, 6:
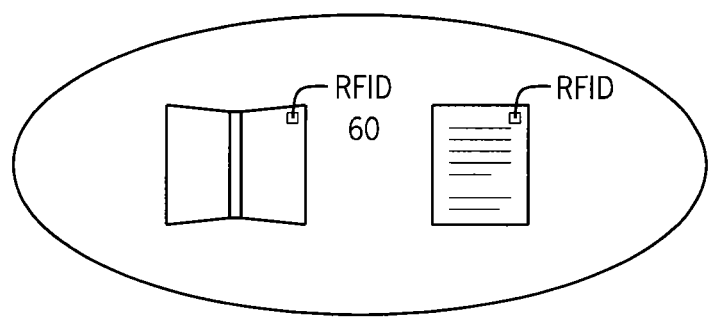
FIG. 5 is another embodiment of a lookup table saved on an electronic storage device and used to determine if medication has been input into the backpack and if the medication has been removed or has expired and should be removed from the backpack.
FIG. 6 is an RFID tag disposed on a book.

FIG. 5 is a look up table saved on a (the same or a different) non-transitory electronic storage device and used to determine if medication has been input into the backpack and if the medication has been removed or has expired and should be removed from the backpack. The first column from the left identifies the medication that was placed inside the backpack 1. The second column from the left indicates the RFID reader identifier associated with the medication. The third column from the left if the medication has been inserted or removed from the backpack 1. The fourth column from the left counts the number of days the medication has remained in the backpack 1 without being removed. The fifth column from the left counts the time the medication is needed to be taken (if applicable) and an alert is triggered when the time has elapsed. The sixth column from the left identifies when the expiration date of the medication has been reached.

In this embodiment, the information panel 4 is configured to display body weight of the end user, percentage used to calculate the acceptability of the carry weight, carry weight, medication alerts including but not limited to expiration date, time dosage is to be taken, missing medication, exceeded number of days that the material has remained in the backpack, and status.

If the medication does not come with an RFID identifier, one can be attached and the information associated with the item can be input into the table manually using the information panel 4.

FIG. 6 is an RFID tag 60 that can be placed on materials that do not originally have RFID tags on them. The RFID tag 60 placed on a book, a homework assignment, or any other important material. The RFID Tag 60 is read by the RFID reader when the RFID tag is passed near the RFID reader.

Figure 7:
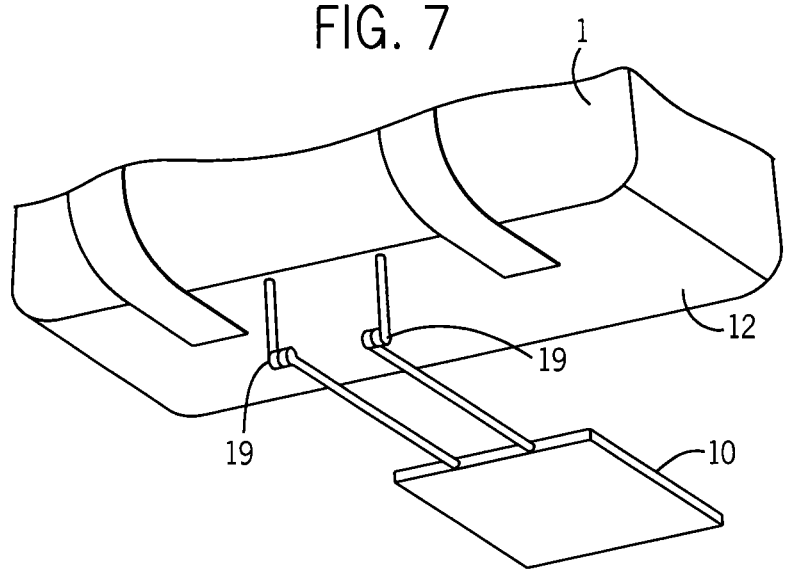
FIG. 7 illustrates a retractably hinged pressure-sensitive scale integrated into the backpack in an extended position.

FIG. 7 is an illustration of a retractable hinged 19 scale 10 attached to the underside 12 of the backpack 1 in the extended position. In the extended position, the end user can stand on the scale and get an accurate measurement of his weight. This weight will be used to calculate the maximum percentage allowable for the carry weight of the backpack 1. The type of scale used will be similar to the NewlineNY SBB0718M-NYBK bathroom scale. The scale is directly connected via a bus to the CPU.

Figure 8:
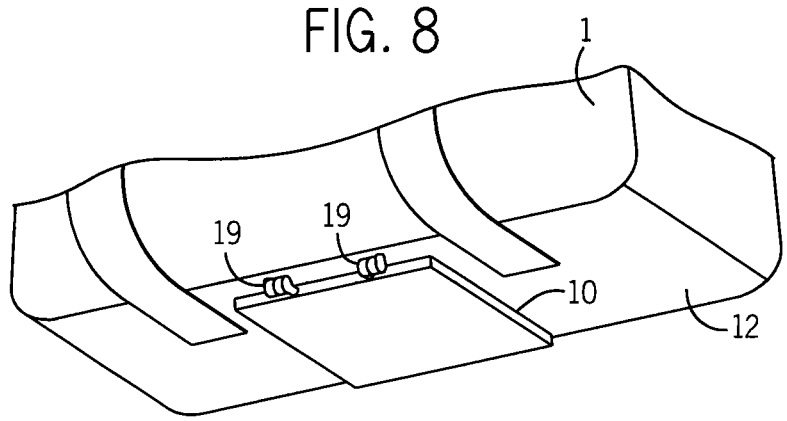
FIG. 8 is an illustration of the retractable hinged scale when in the closed position.

FIG. 8 is an illustration of a retractable hinged 19 scale attached to the underside 12 of the backpack 1 in the closed position. Once the scale is in the retracted position, the scale is seamless to the end user. In the retracted position and placed on a flat surface, the scale can be used to measure the static carry weight of the backpack 1. The carry weight will be used to determine if the contents of the backpack 1 is in an acceptable range. The type of scale used will be similar to the NewlineNY SBB0718M-NYBK bathroom scale.

Figure 9:
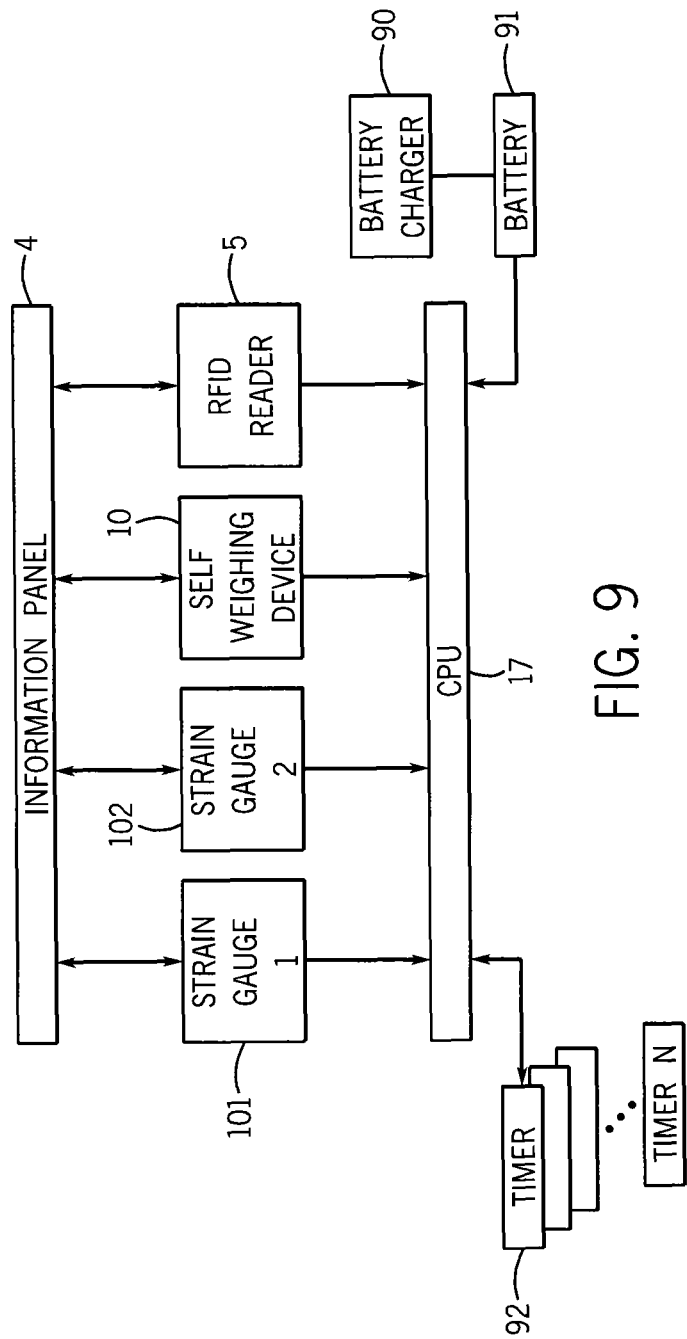
FIG. 9 is a system block diagram of a preferred embodiment of the communication between a self-weighing device, an RFID, a CPU, and an information panel.

FIG. 9 is a system block diagram of the communication between the self-weighing device 10, the RFID reader 5, the CPU 17, a strain gauge Number 1 101, a strain gauge Number 2 102, and the information panel 4. The information panel 4 is coupled to the self-weighing device 10, the CPU 17, the RFID reader 5, a series of timers 92, and provides output to the end user. The self-weighing device 10 provides the weight of the end user and the carry weight of the backpack 1 to the information panel 4 and to the CPU 17 to be used to calculate the percent weight of the carry weight with respect to the end weight of the user to determine if the carry weight is within a specified range. The end result is displayed on the information panel 4. The RFID reader 5 provides input to the CPU 17 and to the information panel 4 based on the materials placed in the backpack 1. If the materials placed in the backpack 1 are time sensitive, the information panel 4 relays the time sensitive information to the series of timers 92. If the time limit is exceeded, an alarm is presented to the information panel 4. A battery charger 90 and a battery 91 are coupled together. The battery 91 is the power source for the CPU 17.

Alternatively a wireless reporting system is adapted to communicate with the CPU 17 and provide the same information between the CPU 17, and information panel 4.

A third party is able to communicate with the information panel 4 to provide parental controls, teacher access, or remote access to the information contained in the CPU 17 of the backpack. The third party can validate if the information contained in the backpack has been accessed to ensure homework has been completed and turned in, to ensure library books have been returned, to ensure medication has been taken and the like.

If the materials placed in the backpack are not RFID compliant, the self-weighing device 10 can be used to manually attach an identifier to the material and the information panel 4 can be used to communicate this information to the CPU 17.

The series of timers 92 are used to identify materials left in the backpack 1 for an extended time resulting in an alarm being issued by the information panel 4.

Teachers are enabled to use RFID codes on homework, report cards, medication, and other important materials to track if these materials have been removed and replaced in the backpack 1 implying that the material has been completed or signed by the parent.

An additional feature allows parents to wirelessly track the wirelessly placed in and removed from the backpack 1, and input an identifier indicating that they acknowledge that the important materials were addressed.

An additional feature would enable GPS identifiers on all important materials allowing wireless tracking by parents, teachers, and the end user.

Figure 10:
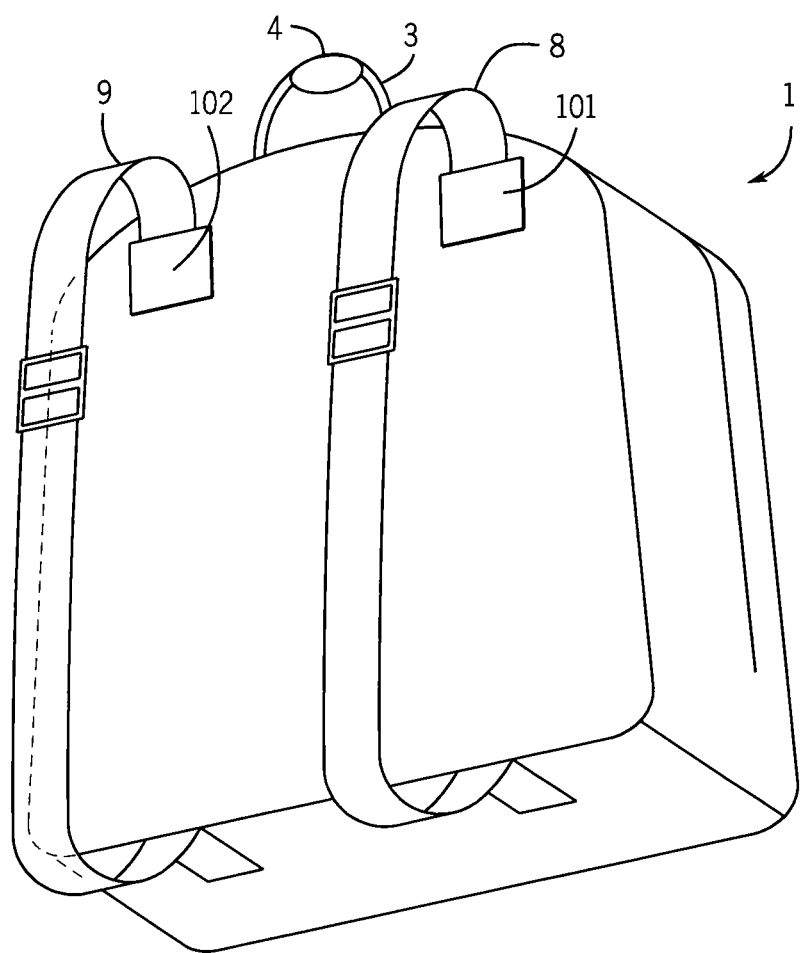
FIG. 10 illustrates a strain gauge integrated into the right carry strap and left carry strap of the backpack.

FIG. 10 illustrates a pair of strain gauges: Strain Gauge Number 1 101 and Strain Gauge Number 2 102 integrated into the right carry strap 8 and the left carry strap respectively of the backpack 1. When the backpack is worn by the end user and the end user is in motion, the contents of the backpack 1 can shift, especially if the end user is moving quickly, resulting in more strain on the end user's body. The pair of strain gauges 101 and 102 dynamically measures the carry weight of the backpack 1 during use and provides the carry weight to the CPU 17 for the calculation of an acceptable carry weight. If the motion of the carry weight causes the carry weight to be in excess of the acceptable weight, an alert is issued and the end user.

Figure 11:
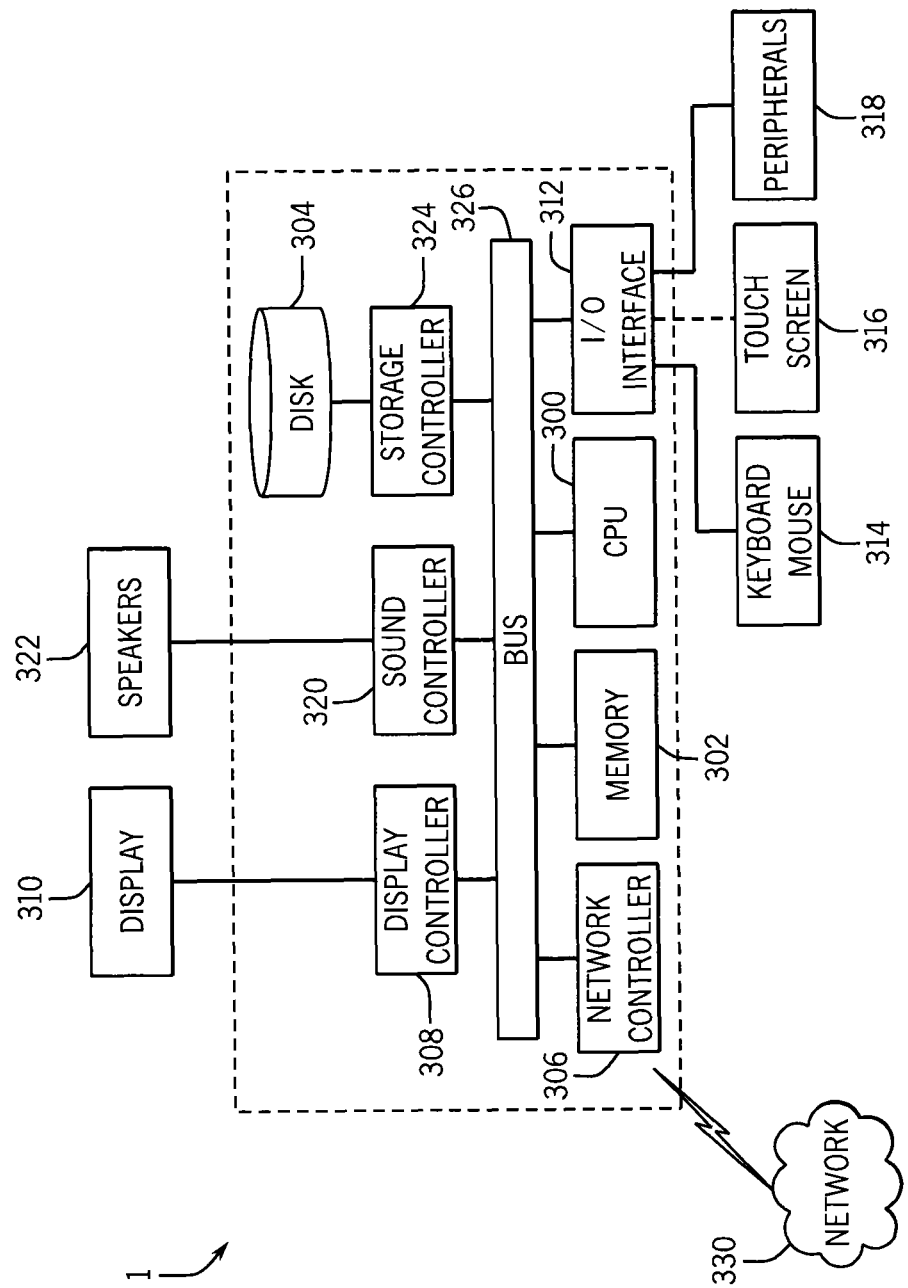
FIG. 11 illustrates a computer system upon which an embodiment of a controller for controlling the information panel may be implemented.

FIG. 11 illustrates a computer system upon which an embodiment of a controller for controlling the information panel may be implemented according to exemplary embodiments is described. The backpack 1 includes a CPU 300 (an example of processing circuitry) which performs the processes described above. The process data and instructions may be stored in memory 302. These processes and instructions may also be stored on a storage medium disk 304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the backpack 1 communicates, such as a server or computer.

Further, the claimed advancements may be provided as a utility application, background daemon, or component of an operating system, or combination thereof, executing in conjunction with CPU 300 and an operating system such as Microsoft Windows 7, UNIX, Solaris, LINUX, Apple MAC-OS and other systems known to those skilled in the art.

CPU 300 may be a Xenon or Core processor from Intel of America or an Opteron processor from AMD of America, or may be other processor types that would be recognized by one of ordinary skill in the art. Alternatively, the CPU 300 may be implemented on an FPGA, ASIC, PLD or using discrete logic circuits (all examples of processing circuitry), as one of ordinary skill in the art would recognize. Further, CPU 300 may be implemented as multiple processors cooperatively working in parallel to perform the instructions of the inventive processes described above.

The backpack 1 in FIG. 11 also includes a network controller 306, such as an Intel Ethernet PRO network interface card from Intel Corporation of America, for interfacing with network 330. As can be appreciated, the network 330 can be a public network, such as the Internet, or a private network such as an LAN or WAN network, or any combination thereof and can also include PSTN or ISDN sub-networks. The network XX can also be wired, such as an Ethernet network, or can be wireless such as a cellular network including EDGE, 3G and 4G wireless cellular systems. The wireless network can also be WiFi, Bluetooth, or any other wireless form of communication that is known.

The backpack further includes a display controller 308, such as a NVIDIA GeForce GTX or Quadro graphics adaptor from NVIDIA Corporation of America for interfacing with display X10, such as a Hewlett Packard HPL2445w LCD monitor. A general purpose I/O interface 312 interfaces with a keyboard and/or mouse 314 as well as a touch screen panel 316 on or separate from display 310. General purpose I/O interface also connects to a variety of peripherals 318 including printers and scanners, such as an OfficeJet or DeskJet from Hewlett Packard.

A sound controller 320 is also provided in the [device], such as Sound Blaster X-Fi Titanium from Creative, to interface with speakers/microphone 322 thereby providing sounds and/or music. The speakers/microphone 322 can also be used to accept dictated words as commands for controlling the backpack or for providing location and/or property information with respect to the target property.

The general purpose storage controller 324 connects the storage medium disk 304 with communication bus 326, which may be an ISA, EISA, VESA, PCI, or similar, for interconnecting all of the components of the [device]. A description of the general features and functionality of the display 310, keyboard and/or mouse 314, as well as the display controller 308, storage controller 324, network controller 306, sound controller 320, and general purpose I/O interface 312 is omitted herein for brevity as these features are known.

I claim:

1. A self-weighing backpack comprising:
a container body;
a right carry strap including a first strain gauge and connected to a right part of the container body, said first strain gauge configured to provide a first force measurement output signal;
a left carry strap including a second strain gauge and connected to a left part of the container body, said second strain gauge configured to provide a second force measurement output signal;
processing circuitry configured to receive a first force measurement output signal and the second force measurement output signal and determine at predetermined times a total dynamic force applied to the right carry strap and the left carry strap, and generate an audio alert signal when the total dynamic force exceeds a predetermined threshold force;
an information panel that receives from the processing circuitry an indication of the total dynamic force and provides a visual display of the total dynamic force;
a non-transitory computer readable storage device that has stored therein an indication of the predetermined threshold force, said predetermined threshold force corresponding to a weight of a user on which the self-weighing backpack is mounted; and a hinged scale that is rotatably attached to a bottom of the container body, and when stood on by the user, provides an indication of weight of the user, wherein the computer readable storage device saves the weight of the user, and the processing circuitry determines the predetermined threshold force in association with the weight of the user.

2. The self-weighing backpack of claim 1 wherein
the information panel includes a data input interface configured to receive as input an age of the user, and
the processing circuitry adjusts the predetermined threshold force based on the age of the user.

3. The self-weighing backpack of claim 2, wherein
the data input interface is configured to receive an activity type of the user, the processing circuitry adjusts the predetermined threshold force based on the activity of the user.

4. The self-weighing backpack of claim 3 wherein
the processing circuitry calculates a maximum carry weight of the backpack and provides to the information panel a recommended maximum percentage carry weight,
and a visual indicator regarding an acceptability or unacceptability of the carry weight,
provides alerts indicating expiration date of materials remaining in the backpack in excess of a predetermined time.

5. The self-weighing backpack of claim 4, further comprising:
an RFID reader configured to read RFID tags of tagged items placed in the the container body, the RFID reader providing tag information to the processing circuitry for the tagged items.

6. The self-weighing backpack of claim 5 wherein
each of the RFID tags are associated with respective weights of the items to which the RFID tags are affixed, and
the processing circuitry keeps track of the items and weights of the items added to the self-weighing backpack.

7. The self-weighing backpack of claim 5 wherein
each of the RFID tags are associated with respective expiration dates of the items to which the RFID tags are affixed, and
the processing circuitry generates an alert when at least one of the times to with the RFID tags are affixed has an expiration date older than a present date.

* * * * *